(12) United States Patent
Fairman et al.

(10) Patent No.: US 12,215,698 B2
(45) Date of Patent: *Feb. 4, 2025

(54) METHODS OF MANUFACTURING TURBOMACHINES HAVING DECOUPLED COLLECTORS

(71) Applicant: Concepts NREC, LLC, White River Junction, VT (US)

(72) Inventors: Kevin Fairman, Lowell, MA (US); Song Xue, White River Junction, VT (US)

(73) Assignee: Concepts NREC, LLC, White River Junction, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,787

(22) Filed: Dec. 21, 2023

(65) Prior Publication Data

US 2024/0133385 A1 Apr. 25, 2024

Related U.S. Application Data

(63) Continuation of application No. 17/872,747, filed on Jul. 25, 2022, now Pat. No. 11,852,149, which is a (Continued)

(51) Int. Cl.
*F04D 29/62* (2006.01)
*F04D 17/16* (2006.01)
(Continued)

(52) U.S. Cl.
CPC .......... *F04D 17/16* (2013.01); *F04D 27/0215* (2013.01); *F04D 29/624* (2013.01);
(Continued)

(58) Field of Classification Search
CPC ... G01L 3/205; G01L 3/20; G01L 3/16; F04D 29/626; F04D 29/624; F04D 17/16;
(Continued)

(56) References Cited

U.S. PATENT DOCUMENTS 1,369,018 A  2/1921  Fell
1,704,412 A  3/1929  Tracy
(Continued)

FOREIGN PATENT DOCUMENTS

EP  0138480 A2  9/1984
EP  0219578 A1  4/1987
(Continued)

OTHER PUBLICATIONS

International Search Report and Written Opinion issued on Jun. 3, 2019, in connection with PCT/US2019/014381, filed on Jan. 19, 2019.

*Primary Examiner* — Woody A Lee, Jr.
*Assistant Examiner* — Behnoush Haghighian
(74) *Attorney, Agent, or Firm* — Downs Rachlin Martin PLLC

(57) ABSTRACT

Turbomachines such as air dynamometers are disclosed that include a radial outflow compressor and gas collector. In some examples, the gas collector is designed as a separate component that is coupled to the machine, such as coupled to a frame. In some examples, the collector and frame are intentionally spaced and coupled at discrete points to minimize the transfer of mechanical and thermal energy therebetween. Aspects of the present disclosure also include turbomachines that include at least one impeller bypass flow path for the direct transfer of air between ambient and a location in the collector downstream of the impeller blades. In some examples, such flowpath(s) may allow for the inflow of external ambient air into the collector. Methods of manufacturing turbomachines having decoupled collectors are also disclosed.

20 Claims, 11 Drawing Sheets

Related U.S. Application Data continuation of application No. 16/946,481, filed on Jun. 24, 2020, now Pat. No. 11,421,695, which is a continuation of application No. PCT/US2019/014381, filed on Jan. 19, 2019.

(60) Provisional application No. 62/619,514, filed on Jan. 19, 2018, provisional application No. 62/634,609, filed on Feb. 23, 2018.

(51) Int. Cl.
*F04D 27/02* (2006.01)
*G01L 3/20* (2006.01)

(52) U.S. Cl.
CPC ...... *F04D 27/0246* (2013.01); *F04D 27/0253* (2013.01); *F04D 29/626* (2013.01); *F05D 2250/52* (2013.01); *G01L 3/20* (2013.01); *G01L 3/205* (2013.01)

(58) Field of Classification Search
CPC .. F04D 17/10; F04D 27/0253; F04D 27/0215; F04D 27/003; F04D 27/009; F04D 27/002; F04D 27/0246; F04D 27/0207; F04D 27/023; F04D 29/441; F04D 29/462; F04D 29/464; F04D 29/668
See application file for complete search history.

(56) References Cited

U.S. PATENT DOCUMENTS

| | | |
|---|---|---|
| 2,014,684 A | 9/1935 | Junkers |
| 2,425,171 A | 8/1947 | Bennett et al. |
| 2,603,968 A | 7/1952 | Cline |
| 2,672,954 A | 3/1954 | Bennett |
| 2,689,476 A | 9/1954 | Ornum |
| 2,711,285 A | 6/1955 | Burrowes |
| 2,798,659 A | 7/1957 | Tweedy |
| 3,448,832 A | 6/1969 | Winkler |
| 3,635,579 A | 1/1972 | Wood |
| 3,926,537 A | 12/1975 | Piper |
| 4,744,724 A | 5/1988 | Brassert et al. |
| 5,218,822 A | 6/1993 | Legg |
| 5,345,827 A | 9/1994 | Brassert et al. |
| 5,426,986 A | 6/1995 | Brassert et al. |
| 5,772,399 A | 6/1998 | Mehta et al. |
| 5,938,527 A | 8/1999 | Oshima et al. |
| 6,190,123 B1 | 2/2001 | Wunderwald et al. |
| 6,641,369 B2 | 11/2003 | Cavatorta |
| 6,945,748 B2 | 9/2005 | Svihla et al. |
| 7,077,627 B2 | 7/2006 | Kupferberg |
| 7,203,416 B2 | 4/2007 | Craw |
| 8,100,631 B2 | 1/2012 | DeBenedictis |
| 8,506,237 B2 | 8/2013 | Japikse et al. |
| 8,851,863 B2 | 10/2014 | Etter |
| 9,091,279 B2 | 7/2015 | Cui |
| 9,097,265 B1 | 8/2015 | Tom |
| 9,163,639 B2 | 10/2015 | Risser |
| 9,416,989 B1 | 8/2016 | Tom |
| 9,816,717 B1 | 11/2017 | Lawrence |
| 10,033,244 B2 | 7/2018 | Le Goff |
| 10,060,442 B2 | 8/2018 | Mornan et al. |
| 10,443,624 B2 | 10/2019 | Hustvedt |
| 10,451,080 B2 | 10/2019 | Klink |
| 10,914,316 B1 | 2/2021 | Mecozzi |
| 11,008,938 B2 | 5/2021 | Hammoud |
| 2006/0034681 A1 | 2/2006 | Kupferberg |
| 2007/0063449 A1 | 3/2007 | Muller et al. |
| 2009/0232641 A1 | 9/2009 | DeBenedictis |
| 2010/0183461 A1 | 7/2010 | Etter |
| 2013/0022449 A1 | 1/2013 | Japikse |
| 2014/0064919 A1 | 3/2014 | Husted et al. |
| 2014/0064920 A1 | 3/2014 | Husted et al. |
| 2014/0064933 A1 | 3/2014 | Husted et al. |
| 2014/0064934 A1 | 3/2014 | Husted et al. |
| 2014/0064948 A1 | 3/2014 | Husted et al. |
| 2014/0321988 A1 | 10/2014 | Husted |
| 2015/0086326 A1 | 3/2015 | Husted et al. |
| 2016/0108921 A1 | 4/2016 | Ishikawa |
| 2017/0234325 A1 | 8/2017 | Prater |
| 2018/0050422 A1 | 2/2018 | Fong |

FOREIGN PATENT DOCUMENTS

| | | |
|---|---|---|
| JP | H02168098 A | 6/1990 |
| WO | 2015077380 A1 | 5/2015 |

METHODS OF MANUFACTURING TURBOMACHINES HAVING DECOUPLED COLLECTORS

RELATED APPLICATION DATA

This application is a continuation of U.S. patent application Ser. No. 17/872,747, filed Jul. 25, 2022, and titled "Turbomachines with Decoupled Collectors," which application is a continuation of U.S. patent application Ser. No. 16/946,481, filed on Jun. 24, 2020, now U.S. Pat. No. 11,421,695, which application was a continuation of PCT/US2019/014381, filed on Jan. 19, 2019, and titled "Turbomachines with Decoupled Collectors," which application claims the benefit of priority of U.S. Provisional Patent Application Ser. No. 62/619,514, filed Jan. 19, 2018, and titled "Radial Outflow Compressor with Separate Impeller Housing and High-Energy Gas Collector", and U.S. Provisional Patent Application Ser. No. 62/634,609, filed Feb. 23, 2018, and titled "Air Dynamometer." Each of these applications is incorporated by reference herein in its entirety.

FIELD OF THE DISCLOSURE

The present disclosure generally relates to the field of turbomachinery. In particular, the present disclosure is directed to methods of manufacturing turbomachines having decoupled collectors.

BACKGROUND

A compressor is a type of turbomachine designed to impart energy to a working fluid with a rotating impeller. The higher energy fluid typically flows from the impeller into a collector. In some prior art designs, the collector and the impeller are in a common housing. The working fluid is then typically directed to a pipe or duct via the outlet flange of the vessel.

SUMMARY OF THE DISCLOSURE

In one implementation, the present disclosure is directed to a turbomachine that includes a compressor including an impeller having a plurality of blades, the impeller rotatably supported by a frame; and a collector coupled to the frame and fluidly coupled to the impeller to collect air discharged by the impeller; wherein the collector is supported by the frame independently of the compressor.

In another implementation, the present disclosure is directed to a turbomachine that includes a compressor including an impeller having a plurality of blades, the impeller rotatably supported by a frame; and a collector coupled to the frame and operably coupled to the impeller to collect air discharged by the impeller; wherein the turbomachine includes at least one impeller bypass flow path for the direct transfer of air between ambient and a location within the collector downstream of the impeller blades.

In yet another implementation, the present disclosure is directed to a method of manufacturing a turbomachine including a collector, a frame, and a compressor having an impeller, the impeller having a plurality of impeller blades. The method includes providing mechanical and thermal attenuation between the collector, compressor, and frame by independently supporting the collector and compressor by the frame, to minimize, during operation, the transfer of mechanical and thermal energy between the collector and compressor.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Aspects of the present disclosure include turbomachines such as air dynamometers that include a radial outflow compressor and gas collector. In some examples, the gas collector is designed as a separate component that is coupled to the machine, such as coupled to a frame. The collector and compressor may be independently supported by the frame. In some examples, the collector and frame are intentionally spaced and coupled at discrete points to minimize the transfer of mechanical and thermal energy therebetween. Aspects of the present disclosure also include turbomachines that include at least one flow path for the direct transfer of air between ambient and a location in the collector downstream of the impeller blades. In some examples, such flow path(s) may promote inflow of external ambient air into the machine.

Turbomachines with a separate collector design can provide a variety of benefits. For example, high compressor exit velocities, e.g. supersonic, can cause vibrations in the collector. By providing a separate collector, the transfer of collector vibrations from the collector to the rest of the machine, such as impeller shaft bearings, is minimized. Also, high gas temperatures, e.g., greater than 400 degrees F., at the impeller exit can cause thermal stress in the collector. A separate collector design allows for easier management of such thermal stresses and the ability to minimize the transfer of such stresses to the rest of the machine. Manufacturing costs can also be reduced by designing the collector as a separate component that is coupled to the machine. For example, lower cost materials, such as sheet metal, can be used, and tolerances can be lower. By incorporating a flow path for the direct transfer of air between ambient and a location in the collector, cool ambient air can be drawn into the collector, thereby minimizing thermal stresses caused by high temperature gas exiting the compressor. Further, the at least one flow path may be located at an interface between the collector and the impeller shroud, thereby obviating the need to seal the interface, thereby reducing manufacturing costs. In some examples, the impeller and collector are designed so that during use, the pressure, e.g., a static pressure, at the impeller exit is below atmospheric pressure, e.g., in the range of approximately −47379 Pa to approximately −641 Pa (gauge pressure), thereby facilitating an unsealed interface and the transfer of cooling ambient air into the collector.

Figure 1:
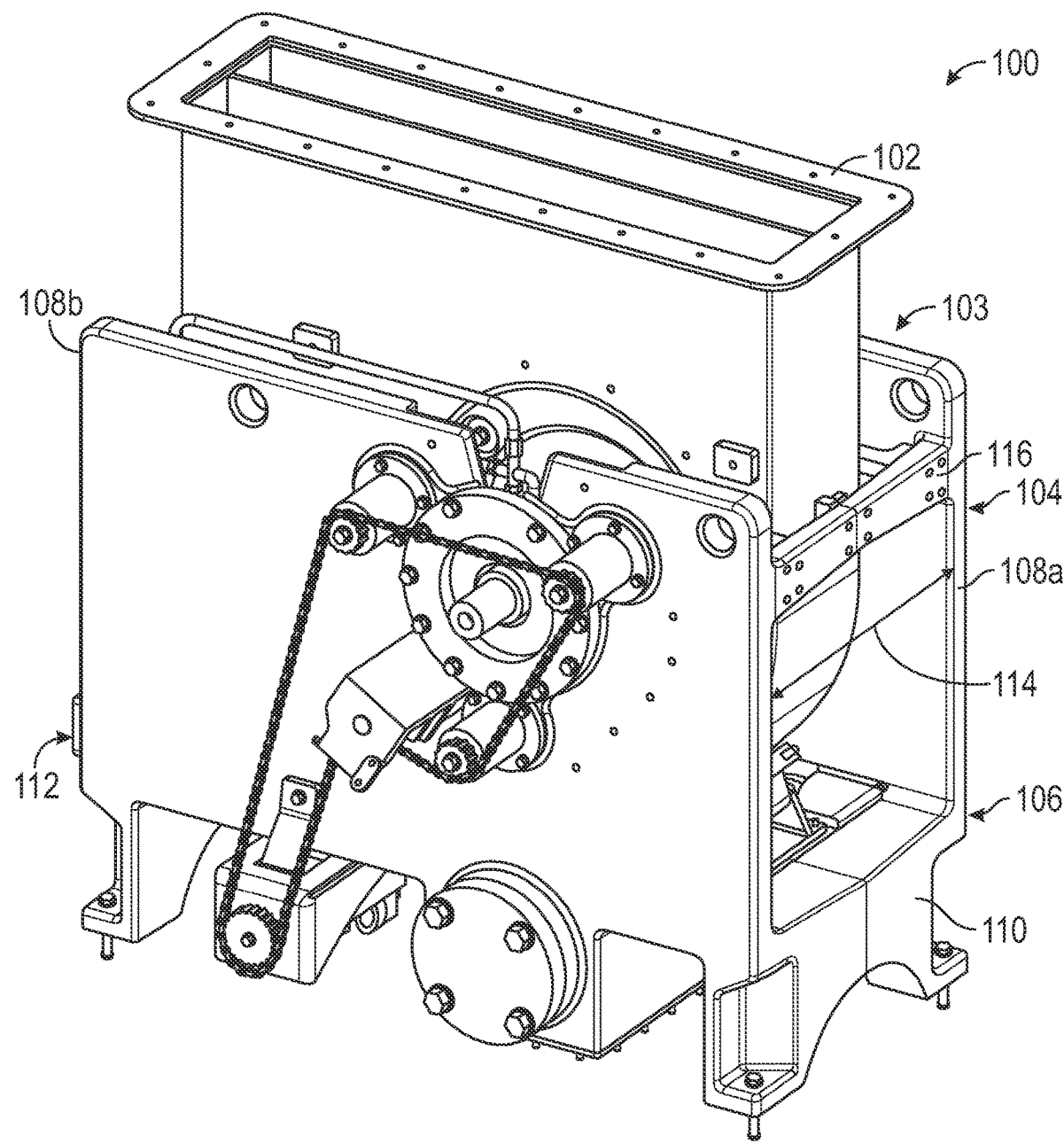
FIG. 1 is a perspective view of an air dynamometer including a compressor and collector independently coupled to and supported by a frame.

FIG. 1 illustrates an example embodiment of an air dynamometer 100 made in accordance with the present disclosure. Air dynamometer 100 includes a collector 102 and a compressor 103 coupled to a frame 104. Frame 104 has a U-shape or yoke-shape configuration including a base 106 and two opposed vertical supports 108a, 108b extending vertically from the base. In the illustrated example, base 106 has first and second ends 110, 112, and vertical supports 108a, 108b extend along the entire length of the base from the first to the second ends. Vertical supports 108a, 108b are spaced from one another, defining a space 114 therebetween, and collector 102 is located in the space, positioned above base 110 and coupled to frame 104. Collector 102 is constructed as a separate component from frame 104 and, as described below, coupled to the frame at discrete attachment points. In the illustrated example, collector 102 and frame 104 are constructed from different materials, for example, frame 104 may be constructed from cast iron, which can have the benefit of providing vibration dampening and collector 102 can be formed from sheet metal. In other examples, collector 102 and frame 104 may be formed from the same type of material.

Figure 2:
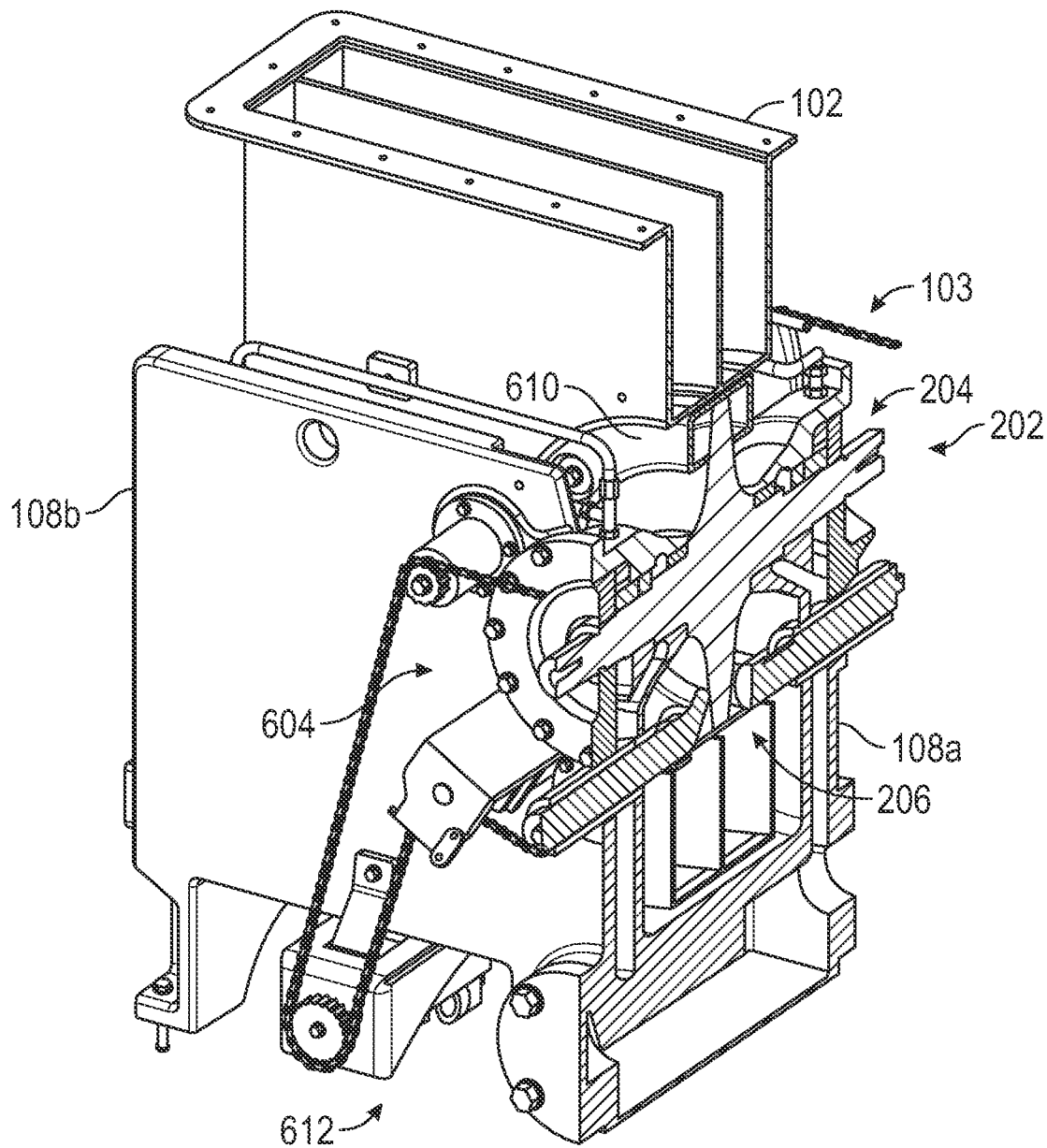
FIG. 2 is a cross-sectional perspective view of the air dynamometer of FIG. 1.

FIG. 2, is a perspective cross-sectional view of air dynamometer 100. As shown, compressor 103 includes an impeller 202 having an impeller shaft 204 that is rotatably coupled to vertical supports 108. Impeller 202 also includes a plurality of impeller blades 206 (only one labeled in FIG. 2). As shown in FIG. 2, impeller 202 extends through collector 102, with impeller blades 206 located within the collector. As described more below in connection with FIG. 6, compressor also includes adjustable shrouds 610, bearing assemblies 604, and shroud adjustment assemblies 612.

Figure 3:
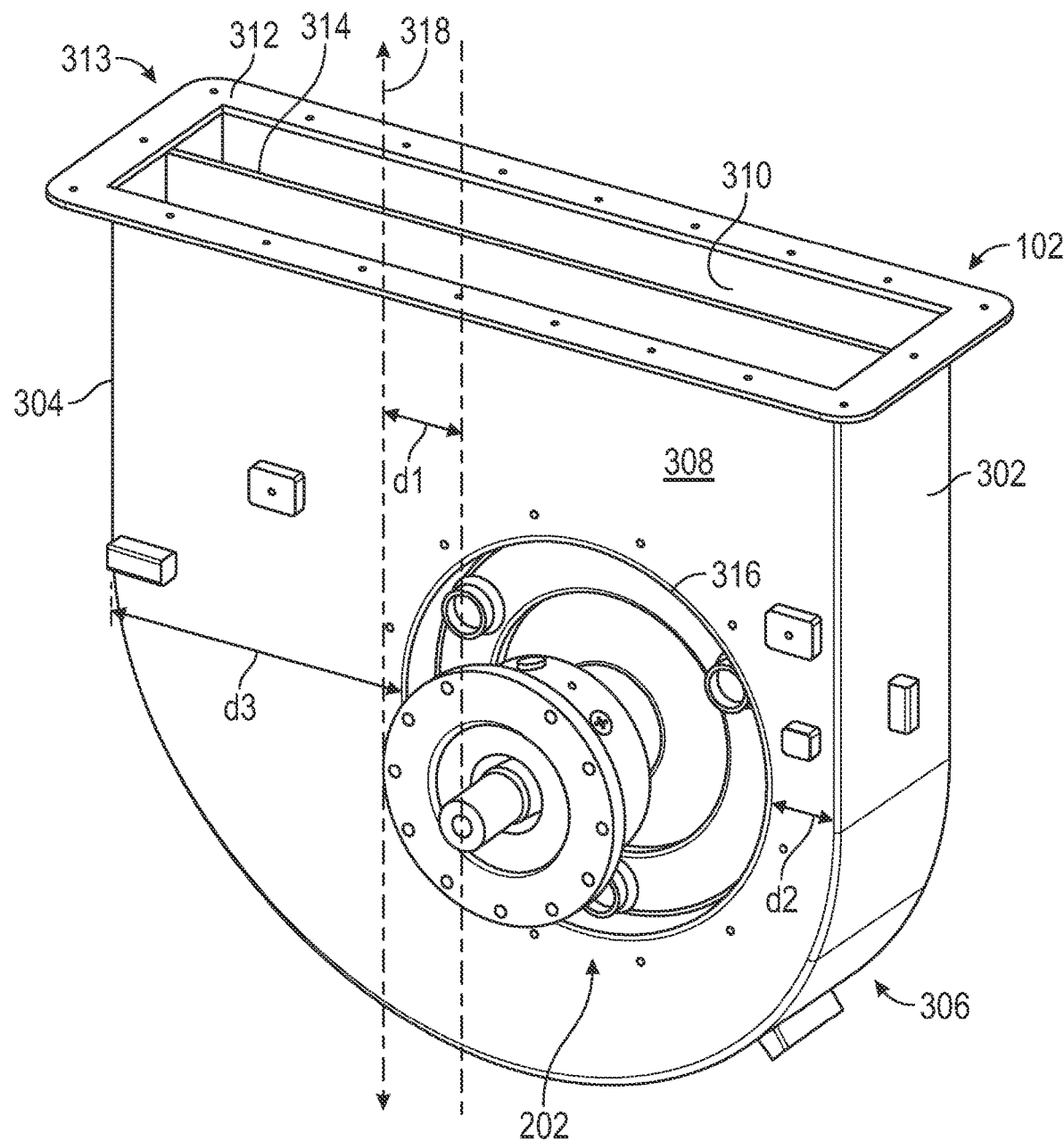
FIG. 3 is a perspective view of the air dynamometer of FIGS. 1 and 2.

FIG. 3 is a perspective side view of collector 102 and impeller 202. Collector 102 includes front and rear walls 302, 304, and a curved bottom wall 306 and also includes opposed side walls 308, 310, collectively defining an interior volume for collecting air discharged by impeller 202. Collector 102 also includes a flange 312 at an exit 313 of the collector for connecting to downstream ducting (not illustrated) and an internal partition wall 314 that partitions the internal volume of the collector into two volumes. Side walls 308, 310 include annular inlets 316, 402 (see FIG. 4). As shown in FIG. 3, impeller 202 is offset from a centerline 318 of the collector by an offset distance d1, resulting in impeller blades 206 (see FIG. 2) being closer to front wall 302 than rear wall 304 and spaced a first distance d2 from the front wall and spaced a second distance, d3, from the rear wall, the first distance being less than the second distance. As described below, such an offset design can result in improved aerodynamic performance, including reduced gas velocities at collector exit 313, which can reduce noise and vibration.

Figure 4:
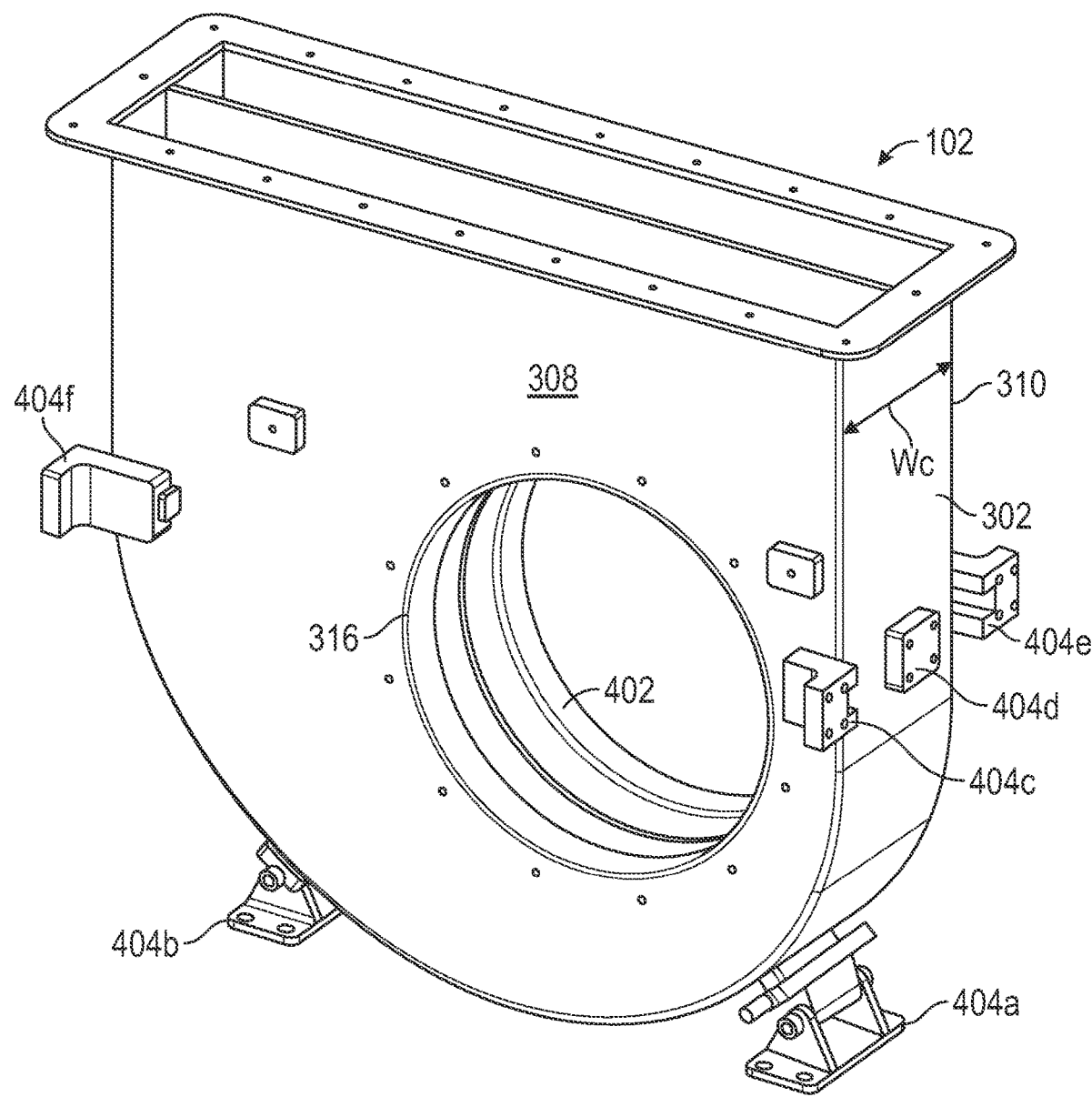
FIG. 4 is a perspective view of the collector of FIG. 3.
Figure 5:
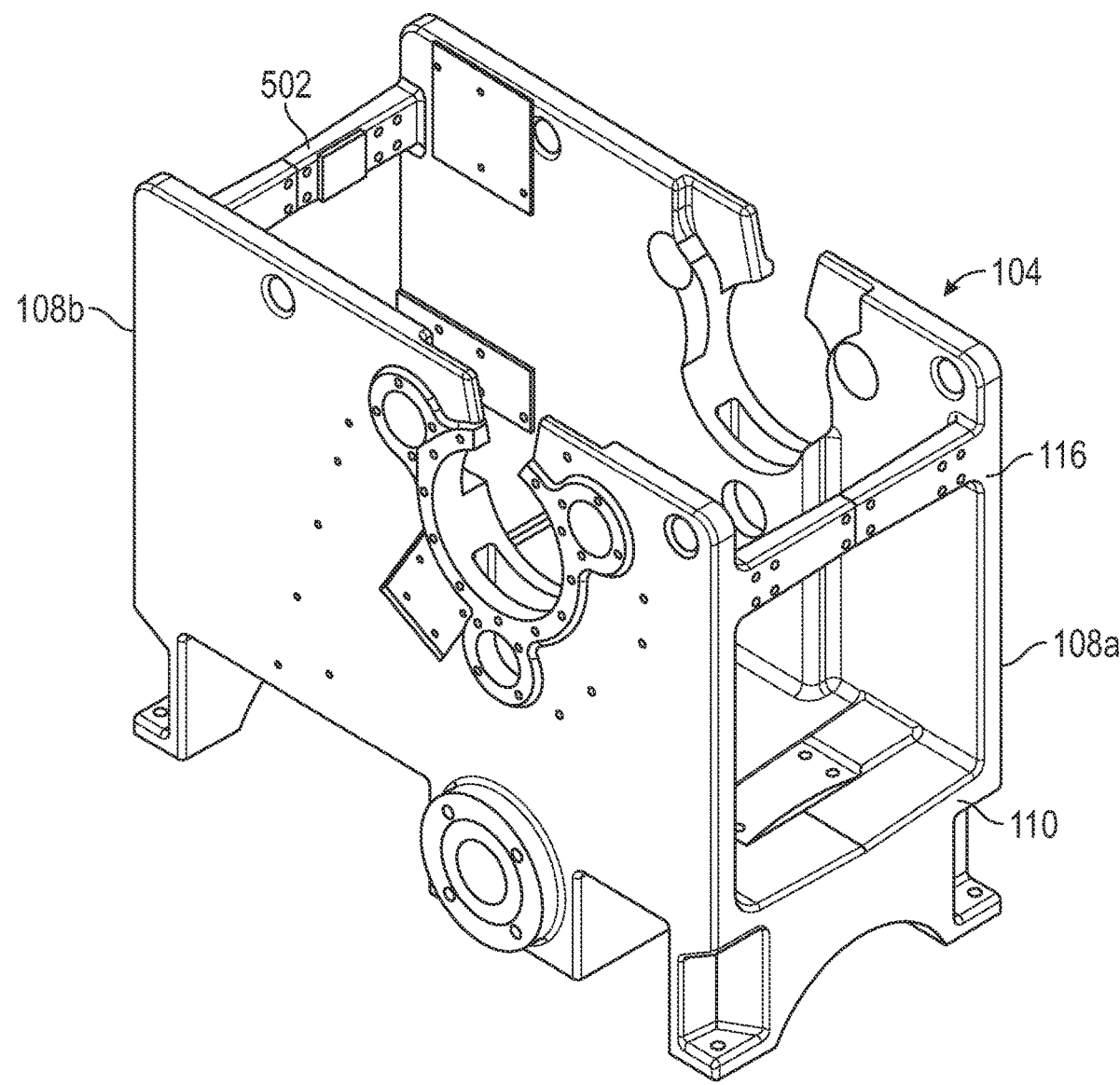
FIG. 5 is a perspective view of the frame of FIGS. 1 and 2.

FIG. 4 is a perspective view of collector 102 and also illustrates mounting brackets 404 configured to couple the collector to the frame at a plurality of discrete attachment points. In the illustrated example, mounting brackets 404 include first and second base mounting brackets 404a, 404b for supporting the collector on base 110 of frame 104 and coupling the collector to the base (see FIG. 1). Mounting brackets 404 also include front mounting brackets 404c, 404d, 404e that are configured to couple the collector to a cross brace 116 of frame 104 (see FIG. 1, 5) and three rear mounting brackets 404 (only rear mounting bracket 404f illustrated), for coupling the collector to a rear cross brace 502 (see FIG. 5) of the frame. A width Wc of collector 102 is less than a length of space 114 between opposed vertical supports 108a, 108b (see FIG. 1), thereby providing a spacing S1, S2 (FIG. 6) between side walls 308, 310 and the adjacent vertical support. Such spacing S1, S2, facilitates the decoupling of collector 102 from frame 104 to minimize the transfer of mechanical and thermal energy therebetween. Mounting brackets 404 extend between collector 102 to frame 104, providing a relatively small number of attachment points between the collector and frame, to minimize the transfer of mechanical and thermal energy. In some examples, one or more of mounting brackets 404 may also include vibration-damping resilient members (not illustrated). For example, at least one layer of any type of resilient material known in the art for providing vibration dampening, such as one or more layers constructed from natural rubber, synthetic rubber, or polymer foam. Mounting brackets 404 may also be designed to allow for some movement of the collector to allow for thermal expansion of the collector. Mounting brackets may be designed as isolation mounts or may incorporate isolation mounts, e.g., elastomeric, spring, or hydraulic isolation mounts. The separate design can allow for vibrations in the collector 102 to be sufficiently attenuated such that the remaining components of the system, including impeller shaft bearings 606 (FIG. 6) are not adversely impacted. The arrangement also allows for thermal expansion of the collector, which may be constructed of sheet metal, and the brackets 404 can also be designed to provide a heat sink function for removing thermal energy from the collector. FIG. 5 is a perspective view of frame 104 illustrating the yoke-shape configuration of the frame with vertical supports 108a, 108b extending vertically from base 110 and front and rear cross braces 116, 502 extending between the vertical supports.

Figure 6:
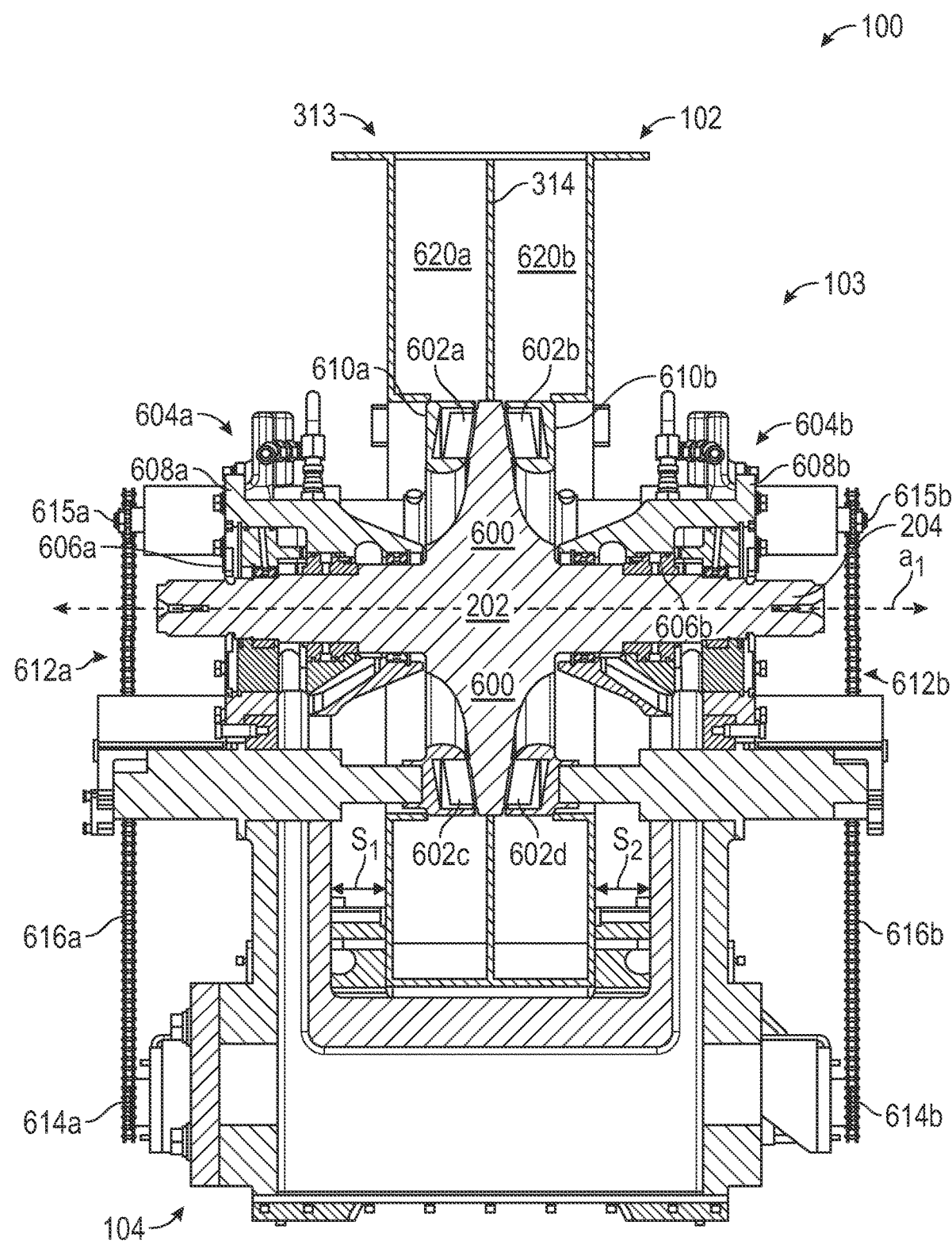
FIG. 6 is a front cross-sectional view of the air dynamometer of FIG. 1 showing moveable shrouds in a fully-closed position.

FIG. 6 is a front cross-sectional view of air dynamometer 100. As shown, compressor 103 includes impeller 202, which in the illustrated example is a radial outflow impeller, the impeller including a hub 600 and a plurality of impeller blades 602 (only four blades 602a, 602b, 602c, 602d shown). Compressor 103 also includes bearing assemblies 604a, 604b, which include bearings 606a, 606b disposed in bearing housings 608a, 608b for rotatably coupling impeller 202 to frame 104. Compressor 103 also includes shrouds 610a, 610b which are moveable in an axial direction parallel to a longitudinal axis al of impeller shaft 204. Shrouds 610 are moveable for controlling the power or energy consumption of the dynamometer. Shrouds 610 have a complementary shape to an outer shape of impeller blades 602, including an annular outer shape and a c-shaped cross section for sliding over the blades, to thereby control an amount of air reaching the impeller blades. Dynamometer 100 also includes shroud adjustment assemblies 612a, 612b that include motors 614a, 614b, gearing 615a, 615b, and chains 616a, 616b for moving the shrouds 610. As shown in FIG. 6, collector 102 surrounds impeller 202, with impeller blades 602 located within the collector. Impeller blades 602 include two opposed rows of blades located on opposed sides of hub 600 and partition wall 314 is located between the two rows of blades, creating partitioned interior volumes 620a, 620b that separately direct compressed air from the two rows of blades through the partitioned interior volumes towards impeller exit 313. Thus, collector 102 and compressor 103 are independently supported by frame 104, and the collector is not structurally supported by the compressor. Instead, in the illustrated example, collector 102 and compressor 103 only directly interface mechanically where shrouds 610 are slidably disposed within annular inlets 316, 402 (FIG. 4). Such structural separation between collector 102 and compressor 103 helps minimize any transfer of mechanical or thermal energy from the collector to the compressor.

Figure 7:
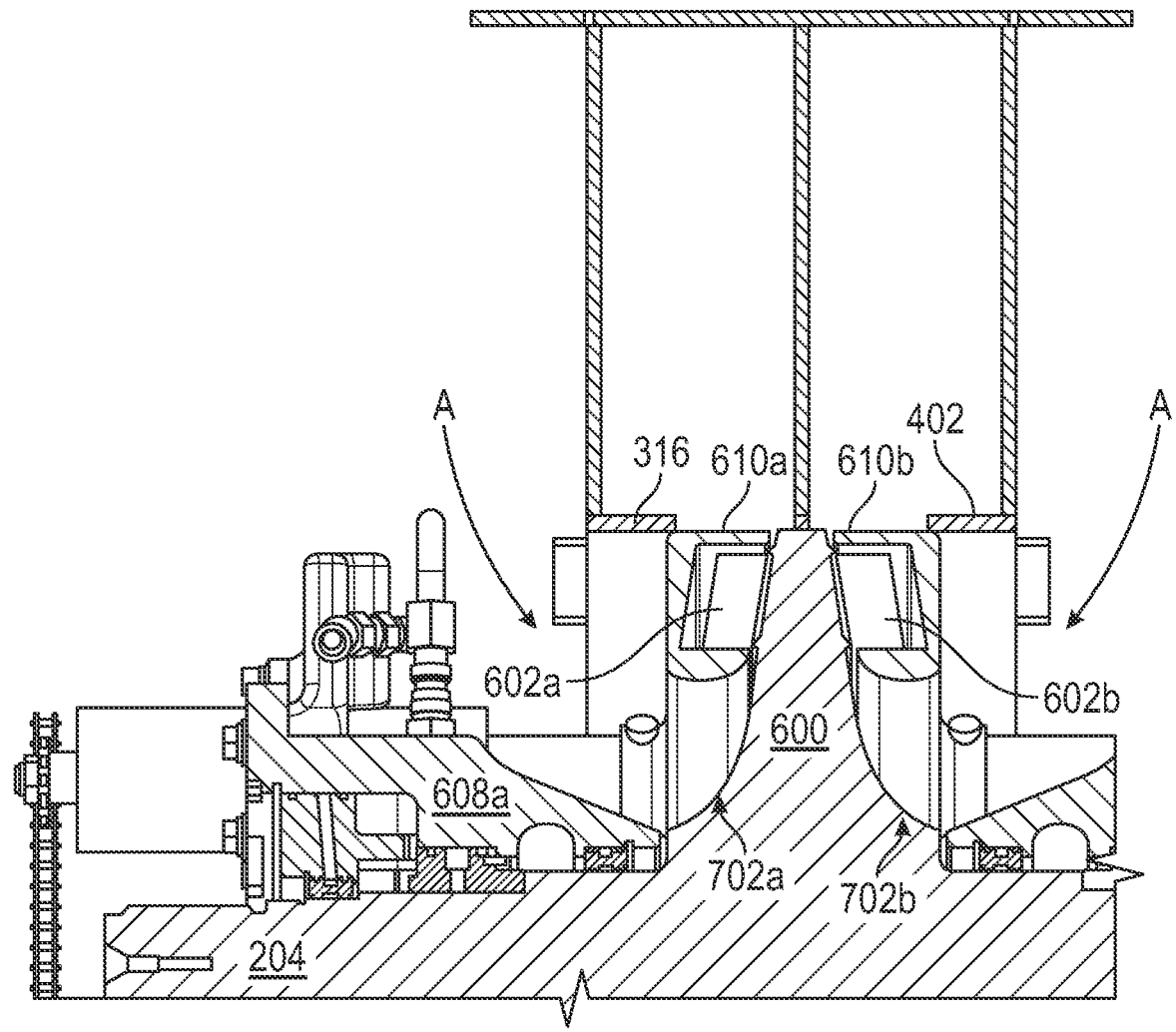
FIG. 7 is a close-up front cross-sectional view of the air dynamometer of FIG. 1.

FIG. 7 is a close-up front cross-sectional view of air dynamometer 100. During operation, ambient air enters through annular inlets 316, 402 in the general direction illustrated by main gas flow path arrows A. Main gas flow path A is defined in part by bearing housings 608 and hub surface 702 on a hub side and defined in part by annular inlets 316, 402, and shrouds 610a, 610b on a shroud side. FIG. 7 illustrates shrouds 610 in a fully inserted position, which prevents air from reaching impeller blades 602. During operation, impeller shaft 204 is driven by a driving force, such as a motor (not illustrated), and the amount of energy consumed by impeller 202 can be increased by retracting shrouds 610 from impeller blades 602, thereby increasing the volume of airflow that enters air dynamometer 100 and that is compressed by impeller 202.

Figure 8:
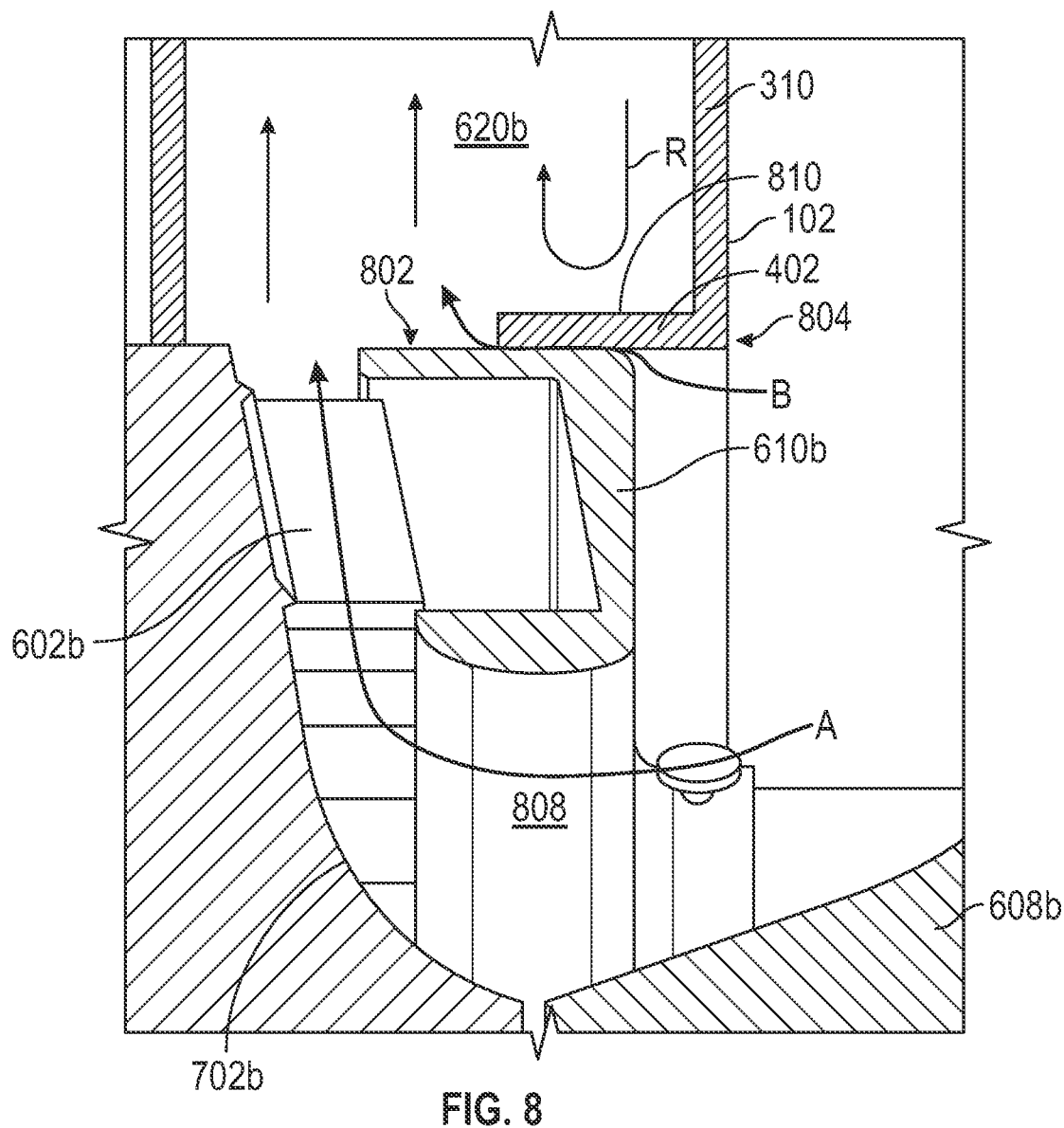
FIG. 8 is another close-up front cross-sectional view of the air dynamometer of FIG. 1.

FIG. 8 is a close-up front cross-sectional view of air dynamometer 100. As shown, in the illustrated example, annular inlet 402 of collector 102 is configured and dimensioned to closely fit around an outer surface 802 of shroud 610b forming an interface 804 between the collector and impeller 202 (annular inlet 316 is similarly configured to fit around shroud 610a to form an interface). In the illustrated example, interface 804 is not sealed (and the interface between annular inlet 316 and shroud 610a on the opposite side of the collector is similarly not sealed), thereby creating an impeller bypass flow path B for the direct transfer of air between ambient and an interior volume 620b of the collector at a location in the collector downstream of the impeller blades 602. Flow path B, therefore, allows for bypassing impeller 202 and the direct transfer of air between ambient and an internal volumes 620a, 620b of the collector. In other examples, air dynamometer 100 may include one or more seals to prevent the flow of gas across interface 804. Examples of seals may include any type of elastomeric seal, or labyrinth seal. In some examples, air dynamometer 100 may include a seal that is configured to prevent airflow across interface 804, while substantially preventing or attenuating transfer of mechanical and/or thermal energy between collector 102 and shrouds 610. As noted above, interface 804 is not a structural interface for supporting the collector. Instead, in the illustrated example, collector 102 is structurally supported by frame 104 and compressor 103 effectively floats within the collector, with the compressor also independently supported by the frame.

FIG. 8 illustrates main gas flow path A entering between an inner wall 808 of shroud 610b on the shroud side and bearing housing 608b and hub surface 702b on the hub side. Ambient air is compressed and accelerated by impeller blades 602 and discharged into interior volume 620 of collector. Side wall 310 and an outer surface 810 of annular inlet 402 of collector define a shelf that promotes some internal recirculation of air (as illustrated by arrow R) proximate interface 804. In the illustrated example, impeller 202 and collector 102 have an aerodynamic design that results in impeller blades 602 generating a negative static pressure in the interior volume 620b of the collector proximate the impeller blades and interface 804, such that ambient air is drawn into the collector as indicated by arrow B. Such a negative pressure design and unsealed interface 804 can provide a variety of benefits, including the introduction of relatively cool ambient air into the collector, which can reduce the temperature of air inside the collector, reducing thermal stress. Recirculation flow paths R facilitated by the collector shelf at surface 810 also facilitates the inward flow of ambient air into the collector across interface 804. In other examples, collector 102 may have another bypass flow path in addition to or instead of bypass flow path B at interface 804 for allowing the inflow of ambient air, for example, one or more openings in one or more walls 302, 304, 306, 308, 310 of the collector.

Figure 9:
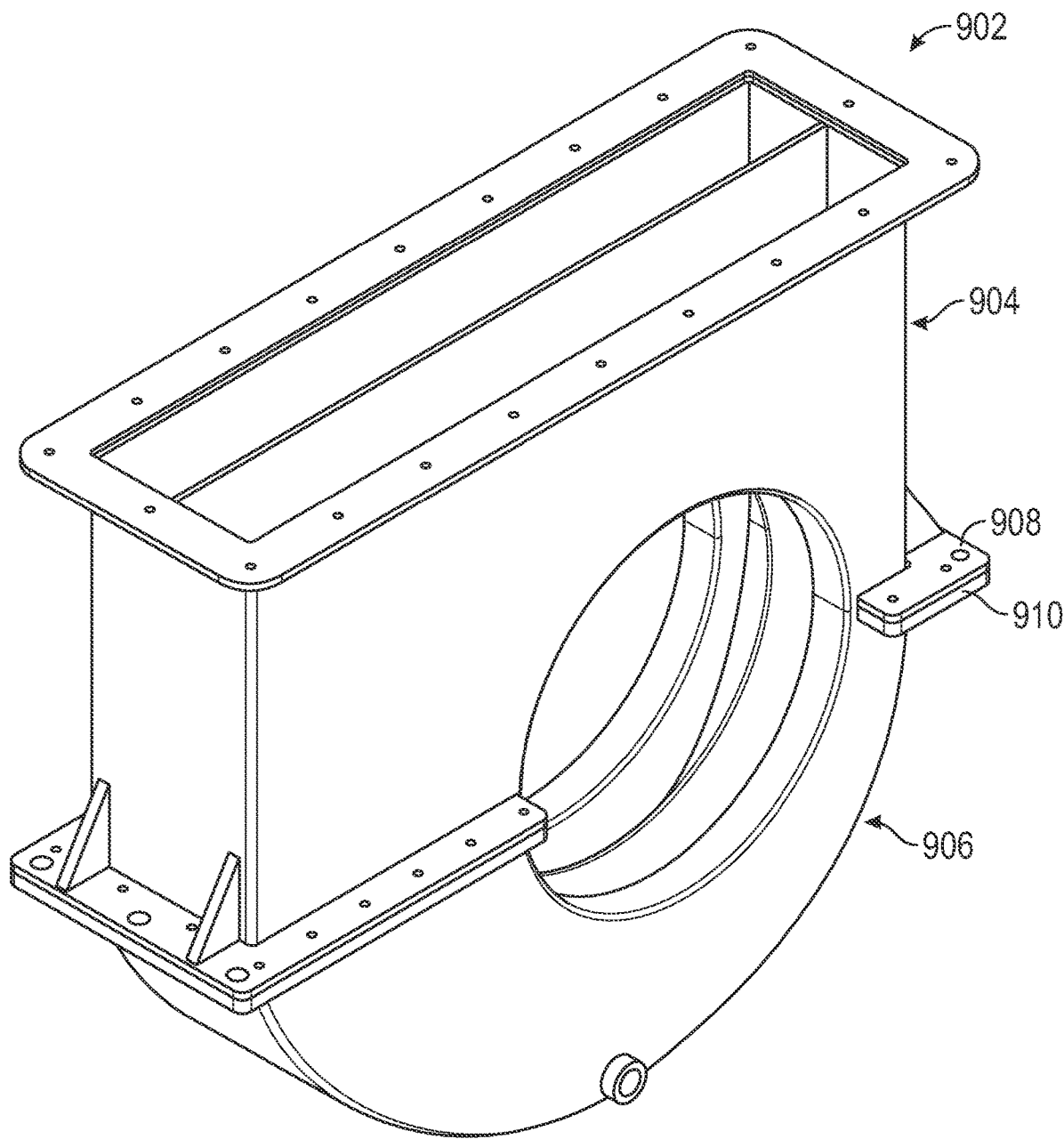
FIG. 9 is a perspective view of another example of a collector made in accordance with the present disclosure.
Figure 10:
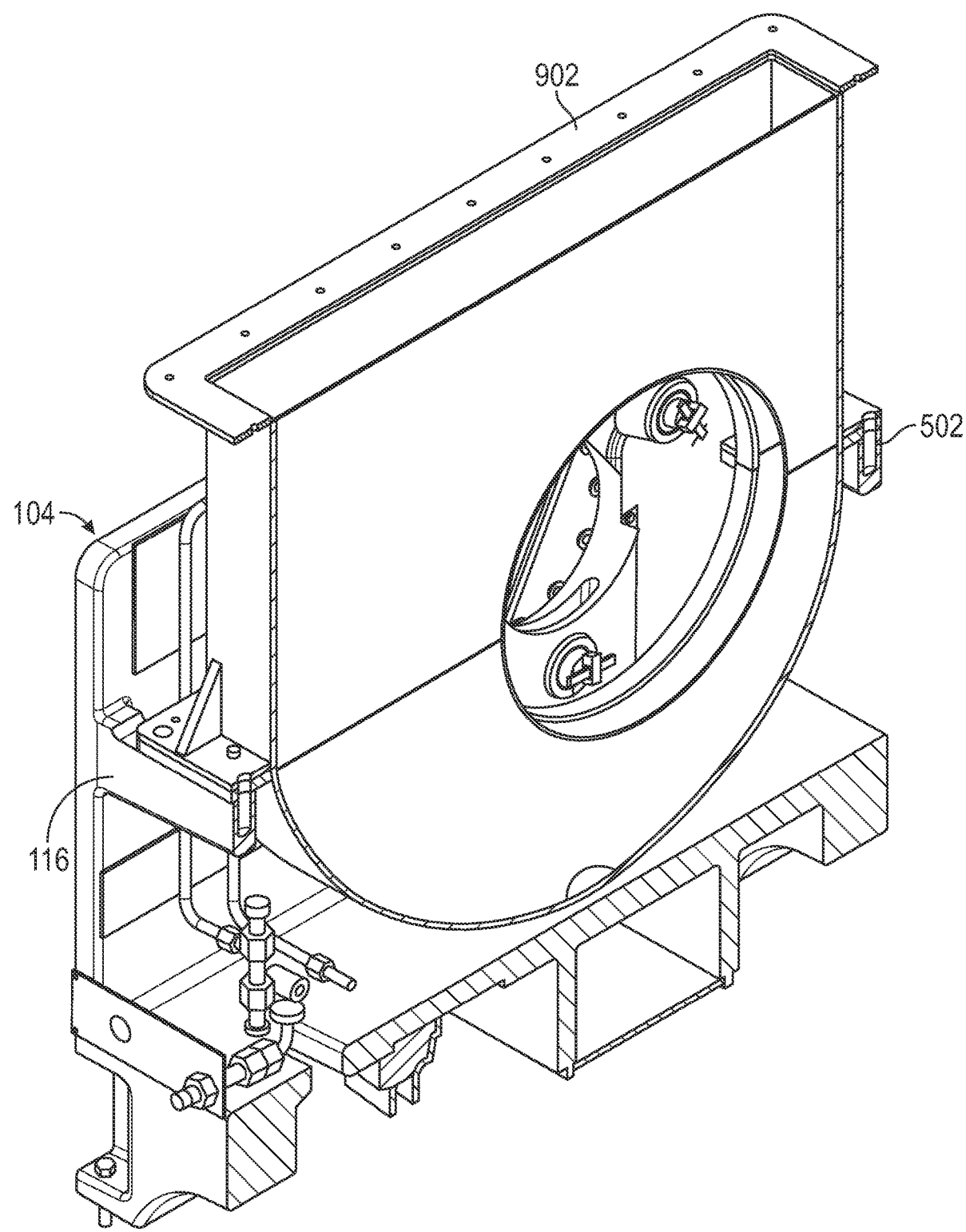
FIG. 10 is a perspective cross-sectional view of the collector of FIG. 9 coupled to a frame.

FIGS. 9 and 10 illustrate another example of a collector 902 that is substantially the same as collector 102 and can be used in place of collector 102. As with collector 102, collector 902 is designed as a separate component from frame 104 and compressor 103 which can provide a variety of benefits, including minimizing the transfer of mechanical and thermal energy, e.g., vibrations and heat transfer, between the collector and the frame and compressor. Collector 902 includes a top half 904 and a bottom half 906 that are coupled together at flanges 908, 910. As shown in FIG. 10, unlike collector 102, which is coupled to frame 104 by mounting brackets 404 (see FIG. 4), collector 902 is configured to be supported by cross braces 116, 502 of frame 104 by positioning flanges 908, 910 on top of the cross members and attaching the flanges to the cross members. Collector 902 is, therefore, positioned on top of a portion of frame 104 and suspended by the frame. As with collector 102, collector 902 is not structurally supported by compressor 103 and the compressor effectively floats within the collector, with the compressor also supported by the frame. In some examples, vibration dampening materials may be added, for example, between flange 910 and cross braces 116 and 502 for further isolating collector 902 from frame 104. The connection of flanges 908, 910 to cross braces 116, 502 can also allow for thermal expansion of the flanges relative to the cross braces for example, by incorporating ovalized or slotted openings in the flanges that are larger in one dimension than an outer diameter of bolts used to attach the collector to the frame. In other examples, collector 902 may include additional mounting brackets, such as mounting brackets 404 (FIG. 4), for attaching the collector to frame 104.

Figure 11:
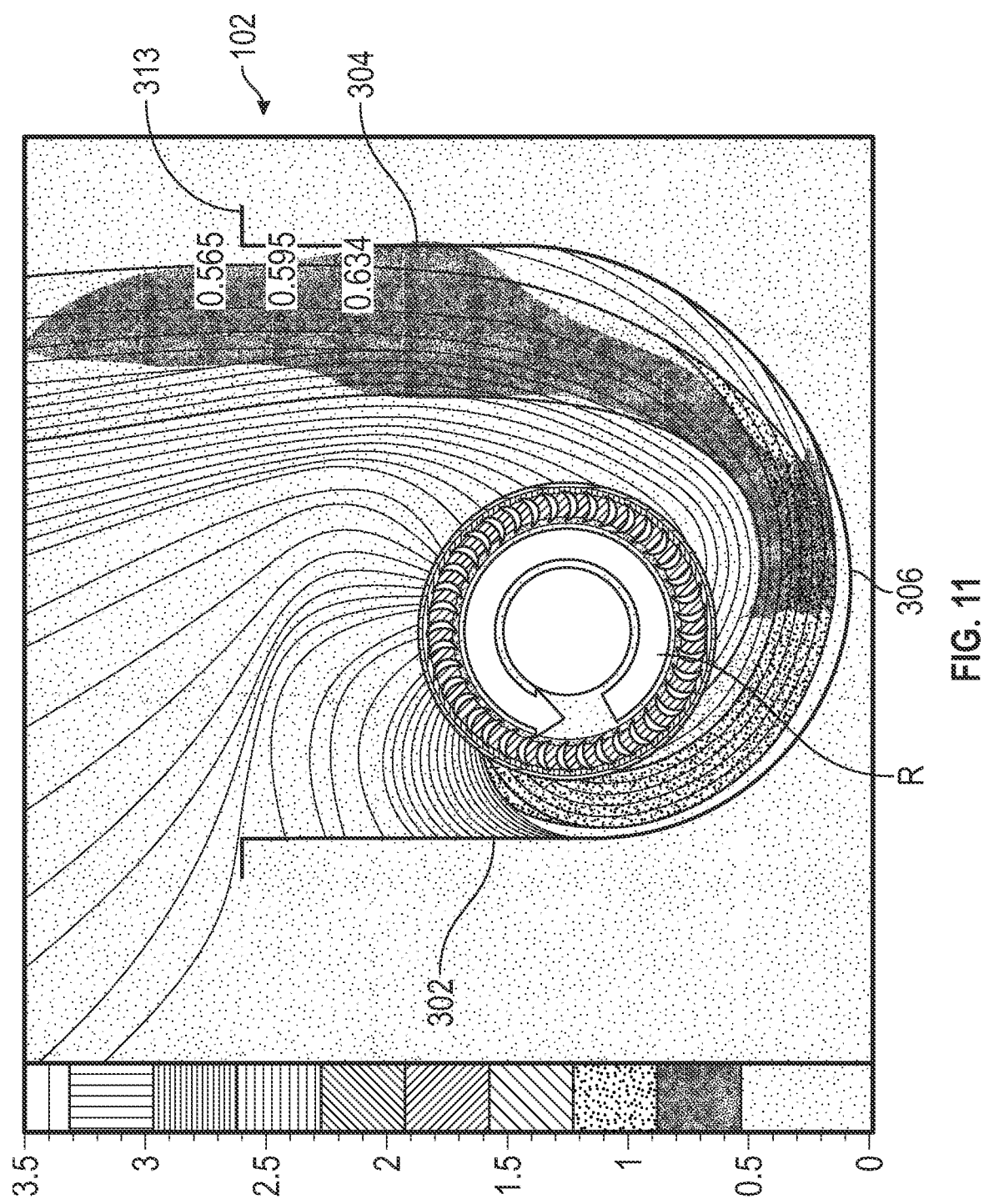
FIG. 11 is an illustration of a computational fluid dynamics calculation of airflow within the collector of FIG. 1.

FIG. 11 illustrates a computational fluid dynamics (CFD) calculation of collector 102 and impeller blades 602 during operation of air dynamometer 100 illustrating air velocities within the collector. As shown in FIG. 11, collector 102 has an asymmetric shape and impeller 202 is offset in the collector, with the impeller being closer to front wall 302 than rear wall 304 (see also FIG. 3). Arrow R indicates the rotational direction of impeller 202 and the illustrated CFD stream tubes show high velocity air is discharged from the impeller blades towards front wall 302 and bottom wall 306 and then decelerates as the air flows towards rear wall 304 and exit 313 of the collector. Such an asymmetric collector shape and offset impeller location can result in reduced air velocities at the collector exit 313 as compared to a centrally-located impeller and/or a symmetrically shaped collector (i.e., symmetric about a vertical centerline extending parallel to front and rear walls 302, 304), which can be beneficial for reducing noise and vibration.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method of manufacturing a turbomachine including a collector, a frame, and a compressor having an impeller and adjustable shrouds, the impeller having a plurality of impeller blades, the method comprising:
   providing mechanical and thermal attenuation between the collector, compressor, and frame by independently supporting the collector and compressor by the frame, to minimize, during operation, the transfer of mechanical and thermal energy between the collector and compressor,
   incorporating at least one impeller bypass flow path for the direct transfer of air between ambient and a location in the collector downstream of the impeller blades; and
   providing the at least one impeller bypass flow path between the collector and the adjustable shrouds.

2. The method of claim 1, wherein the adjustable shrouds include first and second shrouds located on opposed sides of the impeller blades, wherein the first and second shrouds are coupled to the frame, and further including moving the first and second shrouds to control a volume of air transferred from the impeller to the collector.

3. A method of manufacturing a turbomachine, the method comprising:
   coupling a compressor to a frame so that, when the turbomachine is assembled, the frame supports the compressor, wherein the compressor comprises impeller blades and at least one shroud for the impeller blades;
   locating a collector relative to the compressor so that, during operation of the turbomachine, the compressor outputs an energized working fluid to the collector;
   coupling the collector to the frame so that, when the turbomachine is assembled, the frame supports the collector independently relative to the compressor;
   incorporating at least one impeller bypass flow path for direct transfer of air between ambient and a location within the collector fluidly downstream of the impeller blades; and
   providing the at least one impeller bypass flow path between the collector and the at least one shroud.

4. The method of claim 3, wherein the compressor is a radial outflow compressor.

5. The method of claim 4, wherein the turbomachine is an air dynamometer configured for testing rotational machinery.

6. The method of claim 3, wherein the compressor comprises a cast iron housing, and the collector comprises sheet metal.

7. The method of claim 3, wherein the at least one shroud is an adjustable shroud that allows a user to change operating characteristics of the turbomachine.

8. The method of claim 3, wherein the compressor is a radial outflow compressor.

9. The method of claim 3, wherein coupling the collector to the frame includes coupling the collector to the frame using a plurality of discrete brackets.

10. The method of claim 9, wherein each of the discrete brackets is selected to inhibit transfer of vibration between the collector and the frame.

11. The method of claim 10, wherein each of the discrete brackets comprises an isolation mount.

12. The method of claim 9, wherein:
   the frame is a U-shaped frame comprising a base, a pair of spaced-apart vertical supports integrated with the base, and a pair of cross braces extending between the pair of spaced-apart vertical supports proximate to opposite ends of the frame;
   coupling the compressor to the frame includes coupling a pair of shaft bearings, respectively, to the pair of spaced-apart vertical supports; and
   coupling the compressor to the frame includes coupling the collector to the pair of cross braces.

13. The method of claim 12, wherein the compressor is a radial outflow compressor.

14. The method of claim 13, wherein the collector includes:
   spaced-apart first and second sidewalls;
   first and second end walls located at opposite ends of the first and second sidewalls;
   a first annular inlet formed in the first sidewall; and
   a second annular inlet formed in the second sidewall and located in registration with the first annular inlet, wherein the radial outflow compressor extends through the first and second annular inlets;
   wherein each of the first and second annular inlets is located closer to the first end wall than to the second end wall.

15. The method of claim 3, wherein:
   the compressor is a radial outflow compressor; and
   the collector includes:
      spaced-apart first and second sidewalls;
      first and second end walls located at opposite ends of the first and second sidewalls;
      a first annular inlet formed in the first sidewall; and a second annular inlet formed in the second sidewall and located in registration with the first annular inlet, wherein the radial outflow compressor extends through the first and second annular inlets;

wherein each of the first and second annular inlets is located closer to the first end wall than to the second end wall.

16. The method of claim 3, wherein:

the frame is a U-shaped frame comprising a base, a pair of spaced-apart vertical supports integrated with the base, and a pair of cross braces extending between the pair of spaced-apart vertical supports proximate to opposite ends of the frame;

coupling the compressor to the frame includes coupling a pair of shaft bearings, respectively, to the pair of vertical supports; and coupling the compressor to the frame includes coupling the collector to the pair of cross braces.

17. The method of claim 12, wherein the compressor is a radial outflow compressor.

18. The method of claim 17, wherein the collector includes:

spaced-apart first and second sidewalls;

first and second end walls located at opposite ends of the first and second sidewalls;

a first annular inlet formed in the first sidewall; and a second annular inlet formed in the second sidewall and located in registration with the first annular inlet, wherein the radial outflow compressor extends through the first and second annular inlets;

wherein each of the first and second annular inlets is located closer to the first end wall than to the second end wall.

19. The method of claim 3, wherein coupling the collector to the frame is performed for the purpose of attenuating transfer of mechanical energy between the collector and the compressor.

20. The method of claim 19, wherein coupling the collector to the frame is further performed for the purpose of attenuating transfer of thermal energy between the collector and the compressor.

* * * * *